US008869267B1

(12) United States Patent
Smith et al.

(10) Patent No.: US 8,869,267 B1
(45) Date of Patent: Oct. 21, 2014

(54) ANALYSIS FOR NETWORK INTRUSION DETECTION

(75) Inventors: Michael R. Smith, San Mateo, CA (US); Mark S. Janczura, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 1255 days.

(21) Appl. No.: 10/670,166

(22) Filed: Sep. 23, 2003

(51) Int. Cl.
*G06F 21/00* (2013.01)
*G06F 21/50* (2013.01)

(52) U.S. Cl.
USPC .......... 726/22

(58) Field of Classification Search
USPC .......... 726/22
See application file for complete search history.

(56) References Cited

U.S. PATENT DOCUMENTS

| | | | | |
|---|---|---|---|---|
| 5,440,723 | A * | 8/1995 | Arnold et al. | 714/2 |
| 5,568,471 | A * | 10/1996 | Hershey et al. | 370/245 |
| 5,621,889 | A * | 4/1997 | Lermuzeaux et al. | 726/22 |
| 5,825,750 | A | 10/1998 | Thompson | |
| 6,282,546 | B1 * | 8/2001 | Gleichauf et al. | 707/102 |
| 6,321,338 | B1 * | 11/2001 | Porras et al. | 726/25 |
| 6,484,203 | B1 | 11/2002 | Porras et al. | |
| 6,487,666 | B1 * | 11/2002 | Shanklin et al. | 726/23 |
| 6,578,147 | B1 * | 6/2003 | Shanklin et al. | 726/22 |
| 6,704,874 | B1 * | 3/2004 | Porras et al. | 726/22 |
| 6,708,212 | B2 | 3/2004 | Porras et al. | |
| 6,711,615 | B2 | 3/2004 | Porras et al. | |
| 6,785,821 | B1 * | 8/2004 | Teal | 726/23 |
| 2002/0133606 | A1 * | 9/2002 | Mitomo et al. | 709/229 |

OTHER PUBLICATIONS

Heberlein et al., A Network Security Monitor, 1990 IEEE Computer Society Symposium on Research in Security and Privacy, May 7-9, 1990.

Snapp et al., DIDS (Distributed Intrusion Detection System)—Motivation, Architecture and an Early Prototype, 14th Annual National Computer Security Conference, Oct. 1-4, 1991.

Snapp et al., Intrusion Detection Systems (IDS): A Survey of Existing Systems and a Proposed Distributed IDS Architecture, Feb. 1991.

Heberlein et al., Internetwork Security Monitor: An Intrusion-Detection System for Large-Scale Networks, 15th National Computer Security Conference, Oct. 13-16, 1992.

Staniford-Chen et al., GrIDS—A Graph Based Intrusion Detection System for Large Networks, 1996.

Jou et al., Architecture Design of a Salable Intrusion Detection System for the Emerging Network Infrastructure, Apr. 1997.

Porras et al., Emerald: Event Monitoring Enabling Responses to Anomalous Live Disturbances, Oct. 7, 1997.

Porras et al., Conceptual Design and Planning for Emerald: Event Monitoring Enabling Responses to Anomalous Live Disturbances May 1997.

Porras et al., Live Traffic Analysis of TCP/IP Gateways, Nov. 10, 1997.

(Continued)

*Primary Examiner* — William Powers

(74) *Attorney, Agent, or Firm* — Wilmer Cutler Pickering Hale and Dorr LLP

(57) ABSTRACT

A technique for intrusion detection analysis is disclosed. The technique comprises performing a first analysis, wherein the analysis results in a first event; performing a second analysis, wherein the second analysis analyzes the first event; and performing an action associated with the second analysis.

6 Claims, 3 Drawing Sheets

(56) References Cited

OTHER PUBLICATIONS

Anderson et al., SRI International, Next-Generation Intrusion Detection Expert System (NIDES), A Summary, May 1995.

Frank Edward Feather, Ph.D., Fault Detection in an Ethernet Network via Anomaly Detectors, Carnegie Mellon University, 1992.

3Com, HP OpenView for Windows® User's Guide, Transcend Enterprise Manager for Windows Version 6.1, Transcend Workgroup Manager for Windows Version 6.1, Oct. 1997.

Haystack Labs, Inc., NetStalker™, Installation and User's Guide, 1996.

Wheelgroup Corporation, NetRanger™, Network Security, Management System, User's guide, Installation, Configuration, and Operation of the NetRanger System.

Internet Security Systems, Inc., RealSecure™ Release 1.0 for Windows NT™ 4.0, A User Guide and Reference Manual, 1996.

Heady et al., The Architecture of a Network Level Intrusion Detection System, Aug. 15, 1990.

Stake Out™, Network Surveillance, White Paper.

William Hunteman, Automated Information System, (AIS) Alarm System, Oct. 7, 1997.

Heberlein et al., A Method to Detect Intrusive Activity in a Networked Environment, Oct. 1, 1991.

Javitz et al., SRI International, The NIDES Statistical Component Description and Justification, Annual Report, A010, Mar. 7, 1994.

Mukherjee et al., Network Intrusion Detection, 1994.

* cited by examiner

ANALYSIS FOR NETWORK INTRUSION DETECTION

FIELD OF THE INVENTION

The present invention relates generally to computer environments. More specifically, a technique for computer security is disclosed.

BACKGROUND OF THE INVENTION

Computer security is a growing necessity. A primary challenge for network intrusion detection systems is analyzing the volume of network traffic they receive and sifting out the attack related traffic. This becomes and even more difficult task with network speeds in the multi-gigabit range. The sheer volume of data typically limits the types of analysis that can be done at wire speeds, resulting in less reliable attack detection. The more specific an attack can be identified, the more computationally expensive the intrusion detection process can be.

What is needed is a technique for optimizing performance and accuracy while still being able to analyze the large number of events that can occur. The present invention addresses such a need.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
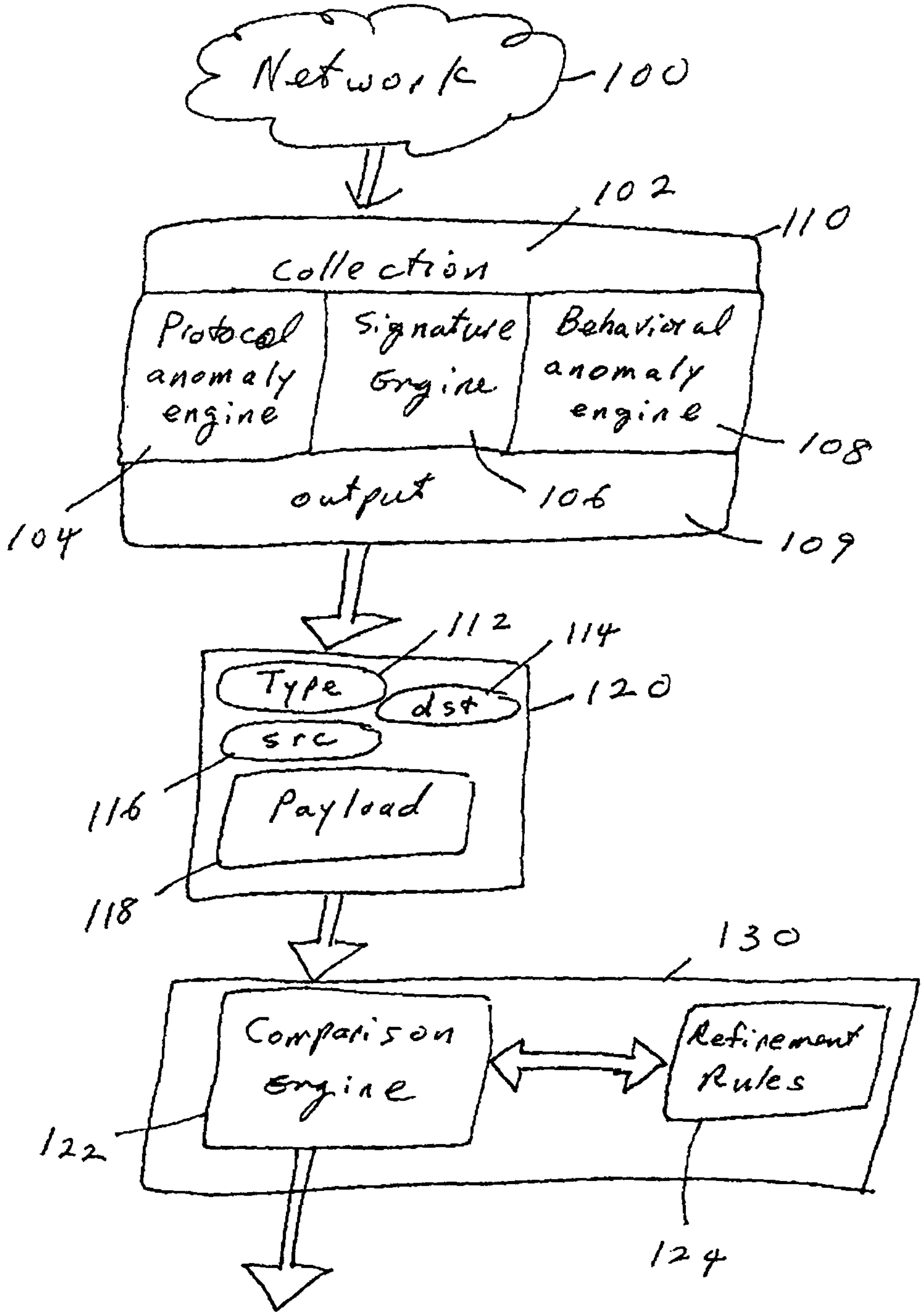
FIG. 1 is an illustration of a technique for multiple layered analysis for network intrusion detection according to an embodiment of the present invention.

FIG. 1 is an illustration of a technique for multiple layered analysis for network intrusion detection according to an embodiment of the present invention. In this example, data flows from a network 100, into a first layer detection engine 110 which outputs an event 120 which then goes into a second layer detection engine 130. Although only two layers of detection are shown in the example of FIG. 1, additional layers of detection can be used according to an embodiment of the present invention.

The first layer detection engine 110 is shown to include a collection portion 102 which collects data from the network 100. The data is processed through one, some, or all analysis engines. Examples of analysis engines include protocol anomaly engine 104, signature engine 106, and behavioral anomaly engine 108. In one embodiment, the collected data is analyzed in parallel using a combination of these analysis engines 104-108. The protocol anomaly engine 104 can provide rules base on known allowed behavior of traffic and sends an alert when a violation of those rules occur. For example, standards and protocols can be provided in the protocol anomaly engine 104 and when a violation of standards and protocols occurs then an alarm is sent. The signature engine can use a known set of rules for an attack, and search for known patterns within the network traffic and send an alarm if a match occurs. The behavioral anomaly engine 108 can look at traffic patterns and determine what is outside the expected norm and send an alarm when an event occurs outside the norm. For example, if a particular computer is normally active during business hours, if it is working at 2:00 AM on Saturday, an alarm can be sent.

These results can be output through the output section 109 as an event 120. The event 120 is shown to include a type of attack 112, a source attack 116, a destination of an attack 114, and payload 118. The payload 118 can be the section of the network packet that triggered the alert. The payload 118 is the portion believed to contain an attack.

The event 120 that is the output of the first layer detection engine 110 is the input for second layer detection engine 130 in this example. The event 120 is input into comparison engine 122 which takes the event 120 and compare it to refinement rules 124.

The second layer detection section 130 can include any type of analysis or filtering. For example, the second layer detection engine can use refinement rules 124 having a signature section and an action section. In this example, the signature portion contains the criteria information that determines when a particular rule applies. The action section can define the behavior to take when a particular rule is matched. For example, a signature can include any, all, or any combination of the following criteria: type, protocol, severity, reliability, source port, destination port, payload, and context. An example of a type includes a string that uniquely identifies an event type. An example of a protocol is the network protocol that applies, such as IP, ICMP, UDP, TCP. Severity can be represented by a numeric representation of how dangerous this potential attack could be. Reliability can be a numeric representation of how reliable the detection is. Source port can be the TCP port of the source of the attack. The destination port can be the TCP port for the destination for the attack. An example of the payload can be a regular expression that is applied to the contents of the network packet that represent the attack. An example of the context includes a regular expression that is applied to application specific information relevant to the attack such as the URL for HTTP based attacks.

In some embodiments, the criteria specified in the signature of a rule can be applied to each event triggered by the first level of detection. If the criteria apply to an event, then the rule is deemed to match the event. For example, a rule can have the following signature:

Protocol=TCP AND Source Port with Port=80

This signature can mean that any event with a protocol setting of TCP and a source port of 80 will match the rule. In the case of match, the action portion of the rule is evaluated.

Examples of actions to be taken in case of a match include Override, Generate, and Drop. In this example, "Override" indicates that some characteristics of the event that match the rule should be changed. For example, the following override rule: type="NEW_TYPE" AND SEVERITY="100" indicates that the type and severity fields of the matched event would be modified to the given values. In another example, "Generate" indicates that instead of modifying the event that matches the refinement rule an additional event should be generated. In another example, "Drop" indicates that the event matching the refinement rule should be discarded. This action can be useful as a filtering mechanism for false positives.

An advantage of having a multi-layered technique is that the first layer engine can analyze a large volume of data in a reasonably short amount of time and the second layer engine can perform analysis on a much reduced volume of data. Accordingly, a significantly more thorough analysis can be performed on data that is more likely to be a threat while still being able to analyze a large volume of incoming data.

Figure 2:
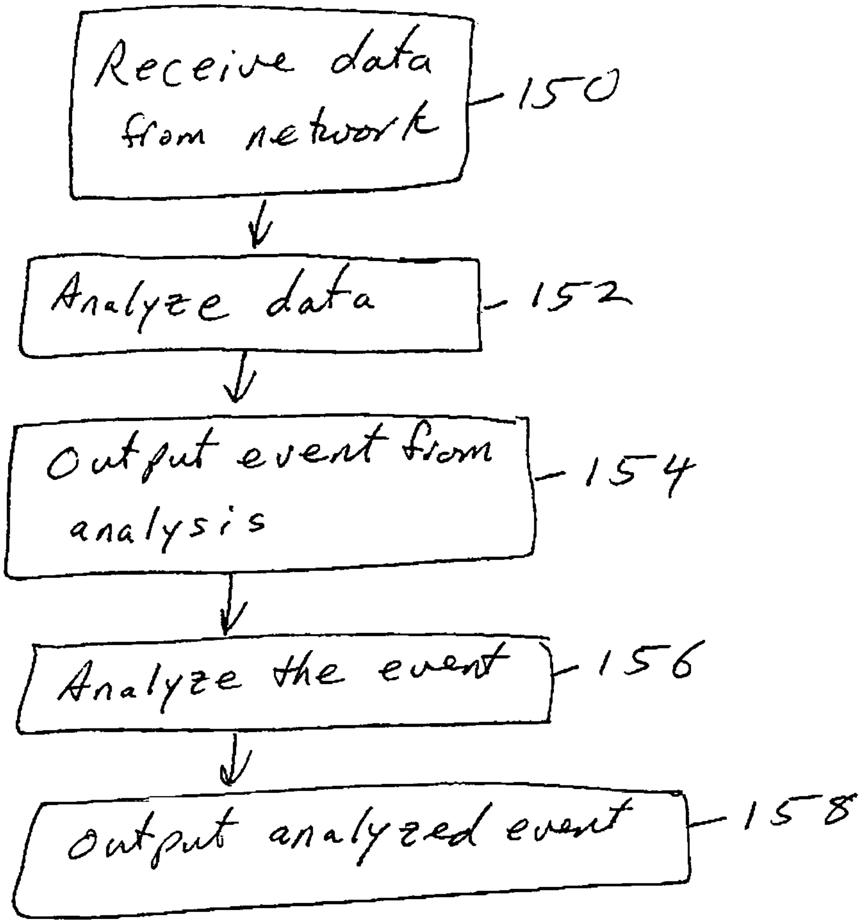
FIG. 2 is a flow diagram of a technique according to an embodiment of the present invention for a technique for multiple layered analysis for network intrusion detection.

FIG. 2 is a flow diagram of a technique according to an embodiment of the present invention for a technique for multiple layered analysis for network intrusion detection. In this example, data is received from the network (150). The data is analyzed (152), for example in the first layered detection engine 110 of FIG. 1. An event is output from the analysis (154). For example, the event may be an alarm highlighting a particular stream of traffic from the network as being a worm. The event is analyzed (156), for example, the event can be analyzed in the second layer detection engine 130 of FIG. 1. The analyzed event is then outputted (158).

Figure 3:
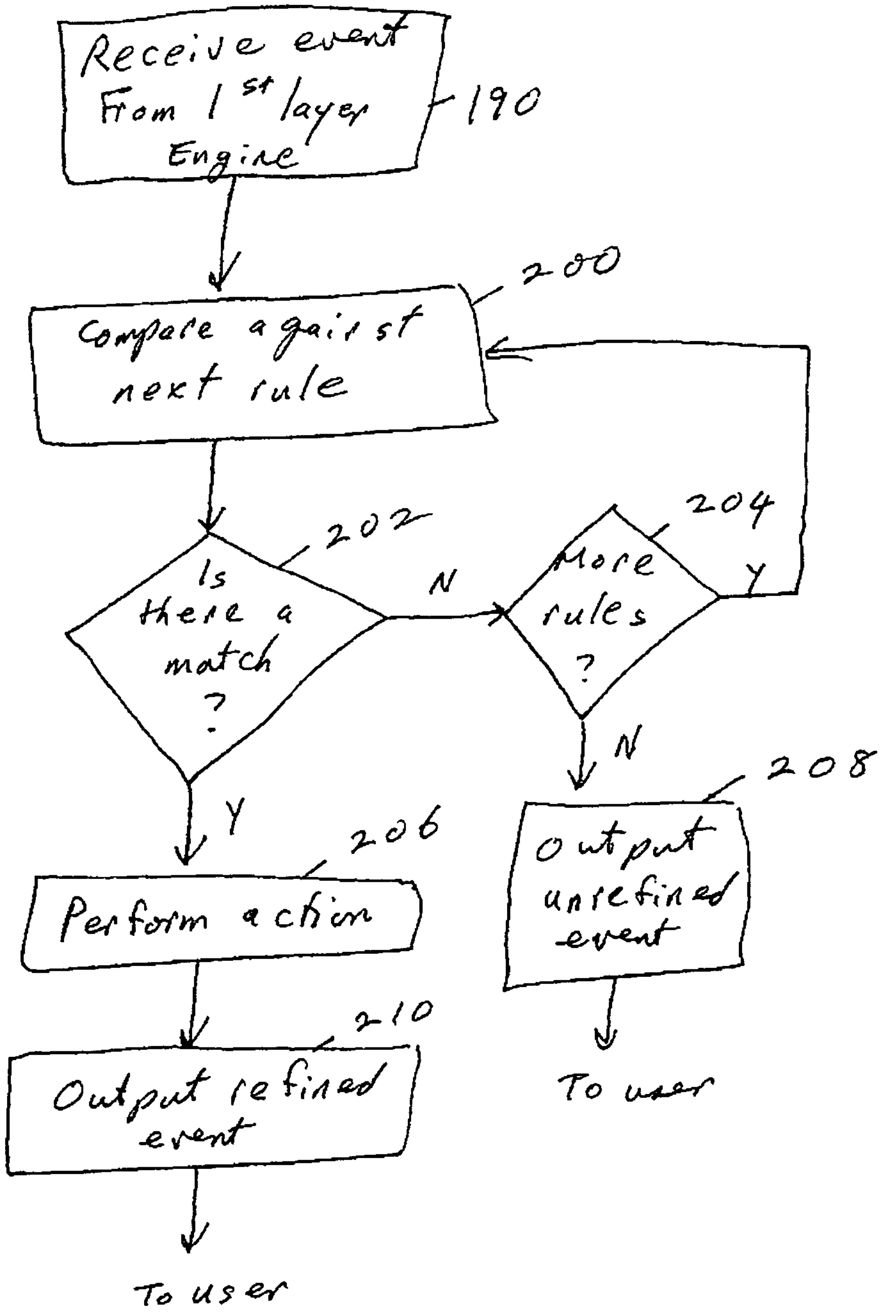
FIG. 3 is another flow diagram of a technique for multiple layered analysis for network intrusion detection according to an embodiment of the present invention.

FIG. 3 is another flow diagram of a technique for multiple layered analysis for network intrusion detection according to an embodiment of the present invention. In this example, an event is received from the first layer engine (190). The event information is compared against a rule (200). It is then determined whether there is a match between the event and the rule (202). If there is a match, then an action is performed (206). An example of an action is changing the type field from a general type to something specific such as "code_red_worm". The refined event is then outputted (210).

If there is no match between the event and the rule (202), then it is determined whether there are more rules (204). If there are more rules, then the next rule is retrieved and the event is compared against the next rule (200). If, however, there are no more rules (204), then the unrefined event is outputted (208). The unrefined event in this example is the same event that was outputted from the first layer engine. Accordingly, if there are no matches to a rule, then the end result of the second layer engine is no worse then the result from the first layer engine.

In a specific example, assume the Code Red Worm spreads through the internet by exploiting a vulnerability in Microsoft's IIS web server. The worm is detected by inspecting HTTP network traffic and looking for a pattern of bits that matches the worm's propagation attempt. In this example, the first layer engine looks at all HTTP communication and alerts when the HTTP protocol is violated. In the case of Code Red, the first layer engine will notice that this particular HTTP request deviates from the HTTP protocol because it is a GET request that contains a message body. At this point, the first layer engine can generate an event that is sent to the second layer engine. This event can contain a summary of what was detected, for example:

type="HTTP_ANOMALY:BAD_REQUEST"
protocol="HTTP"
context="GET /default.ida?NNNNNNNNNNNNNNNNNNNNNNNNN%u9090%u6858%ucbd3%u780 1 . . . " (abbreviated)
source_ip=1.2.3.4
target_ip=5.6.7.8

In this example, the second layer engine looks at this event and compares it against a set of rules. The rule to detect to Code Red might look like the following:

```
<RefinementRule>
<Signature>
  <type>HTTP_ANOMALY:BAD_REQUEST</type>
  <protocol>HTTP</protocol>
  <context>
  <regex>GET /default,ida\?N*%u9090%u6858%
    ucbd3%u7801</regex>
  <context>
</Signature>
<Override>
  <type>CODE_RED_WORM</type>
</Override>
</RefinementRule>
```

In this example, the event matches the signature section of the rule. Accordingly, an override action is performed in this example, changing the type field to "CODE_RED_WORM". The end result may be an event that appears like the following:

type="CODE_RED_WORM"
protocol="HTTP"
context="GET/default.ida?NNNNNNNNNNNNNNNNNNNNNNNNN%u9090%u6858%ucbd3%u7801 . . . " (abbreviated)
source_ip=1.2.3.4
target_ip=5.6.7.8

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for intrusion detection analysis comprising:

performing a first analysis of a request received via a network, wherein the first analysis results in a first event indicating a type of a network protocol anomaly determined via the first analysis to be associated with a propagation attempt of the request received via the network;

performing a second analysis, wherein the second analysis analyzes the first event by comparing the first event against a plurality of refinement rules;

providing a refined event in which a network protocol anomaly attribute of the first event has been modified from a first network protocol anomaly value associated with the type of the network protocol anomaly to a refined event type value associated with a name of a malicious program determined via the second analysis to be attempting to propagate using the type of the network protocol anomaly associated with the request received via the network in response to the first event matching a first refinement rule of the plurality of refinement rules;

generating a second event different from the first event and the refined event in response to the first event matching a second refinement rule of the plurality of refinement rules different from the first refinement rule;

wherein the first event, the second event, and the refined event comprise the malicious program within a content portion of the data;

wherein the content portion of the data is not analyzed in the first analysis;

wherein the first event type value does not uniquely identify the malicious program; and wherein the refined event type value uniquely identifies the malicious program based on the content portion of the request analyzed in the second analysis.

2. A system for intrusion detection analysis comprising:

a processor configured to perform a first analysis of a request received via a network, wherein the first analysis results in a first event indicating a type of a network protocol anomaly determined via the first analysis to be associated with a propagation attempt of the request received via the network;

perform a second analysis, wherein the second analysis analyzes the first event by comparing the first event against a plurality of refinement rules; and provide a refined event in which a network protocol anomaly attribute of the first event has been modified from a first network protocol anomaly value associated with the type of the network protocol anomaly to a refined event type value associated with a name of a malicious program determined via the second analysis to be attempting to propagate using the type of the network protocol anomaly associated with the request received via the network in response to the first event matching a first refinement rule of the plurality of refinement rules;

generate a second event different from the first event and the refined event in response to the first event matching a second refinement rule of the plurality of refinement rules different from the first refinement rule;

wherein the first event, the second event, and the refined event comprise the malicious program within a content portion of the data;

wherein the content portion of the data is not analyzed in the first analysis;

wherein the first event type value does not uniquely identify the malicious program; and wherein the refined event type value uniquely identifies the malicious program based on the content portion of the request analyzed in the second analysis; and a memory coupled to the processor, the memory configured to provide the processor with instructions.

3. At least one non-transitory processor readable storage medium storing a computer program product for intrusion detection analysis, comprising computer instructions for:

performing a first analysis of a request received via a network, wherein the first analysis results in a first event indicating a type of a network protocol anomaly determined via the first analysis to be associated with a propagation attempt of the request received via the network;

performing a second analysis, wherein the second analysis analyzes the first event by comparing the first event against a plurality of refinement rules;

providing a refined event in which a network protocol anomaly attribute of the first event has been modified from a first network protocol anomaly value associated with the type of the network protocol anomaly to a refined event type value associated with a name of a malicious program determined via the second analysis to be attempting to propagate using the type of the network protocol anomaly associated with the request received via the network in response to the first event matching a first refinement rule of the plurality of refinement rules;

generating a second event different from the first event and the refined event in response to the first event matching a second refinement rule of the plurality of refinement rules different from the first refinement rule;

wherein the first event, the second event, and the refined event comprise the malicious program within a content portion of the data;

wherein the content portion of the data is not analyzed in the first analysis;

wherein the first event type value does not uniquely identify the malicious program.

4. The method of claim 1 wherein the malicious program associated with the refined event type value is one malicious program of a plurality of malicious programs that attempt to propagate using the type of the network protocol anomaly determined via the first analysis.

5. The system of claim 2 wherein the malicious program associated with the refined event type value is one malicious program of a plurality of malicious programs that attempt to propagate using the type of the network protocol anomaly determined via the first analysis.

6. The at least one non-transitory processor readable storage medium of claim 3 wherein the malicious program associated with the refined event type value is one malicious program of a plurality of malicious programs that attempt to propagate using the type of the network protocol anomaly determined via the first analysis.

* * * * *